United States Patent [19]
Kuwayama

[11] 3,888,692
[45] June 10, 1975

[54] FLINT OPTICAL GLASS

[75] Inventor: Shigeo Kuwayama, Odawara, Japan

[73] Assignee: Fuji Photo Film Co., Ltd., Minami-Ashigara, Japan

[22] Filed: Aug. 21, 1973

[21] Appl. No.: 390,262

Related U.S. Application Data

[63] Continuation-in-part of Ser. Nos. 182,876, Sept. 22, 1971, abandoned, and Ser. No. 33,500, April 30, 1970, abandoned, and Ser. No. 681,583, Nov. 8, 1967, abandoned.

[30] Foreign Application Priority Data
Nov. 9, 1966   Japan.................................. 41-73651

[52] U.S. Cl. ................................................. 106/53
[51] Int. Cl. ......... C03c 3/04; C03c 3/10; C03c 3/30
[58] Field of Search ............................. 106/53, 47 Q

[56] References Cited
UNITED STATES PATENTS

| | | | |
|---|---|---|---|
| 3,149,984 | 9/1964 | Faulstich.............................. | 106/53 |
| 3,653,933 | 4/1972 | Tsunekawa........................... | 106/53 |

Primary Examiner—Winston A. Douglas
Assistant Examiner—Mark Bell
Attorney, Agent, or Firm—Sughrue, Rothwell, Mion, Zinn and Macpeak

[57] ABSTRACT

A weather-proof, flint, optical glass composition comprising, on a percent by weight basis, from 12.5 to 19.5% $SiO_2$, from 8.0 to 16.5% $Al_2O_3$, from 12.0 to less than 20.0% $B_2O_3$, and from 42.0 to 60.0% PbO.

10 Claims, No Drawings

FLINT OPTICAL GLASS

CROSS-REFERENCE TO PREVIOUS APPLICATION

This application is a continuation-in-part of application Ser. No. 182,876, filed Sept. 22, 1971, of application Ser. No. 33,500, filed Apr. 30, 1970, and of application Ser. No. 681,583, filed Nov. 8, 1967, all the prior applications being now abandoned.

BACKGROUND OF THE INVENTION

1. Field of the Invention

This invention relates to flint optical glass having excellent weather-proof properties and a high refractive index $n_D$.

2. Description of the Prior Art

In the design of lenses, it is desirable to eliminate the so-called secondary spectrum. For such a purpose, two types of optical systems have been offered. One system uses a compound lens in which the ratio of the refractive index to the Abbe number, $n/\nu$, differs from each other. This type of correction for both chromatic and spherical aberration is based on the phenomena that curved aberration in the image plane is small and spherical aberration can be minimized. The optical system under such achromatic conditions is called "apochromat," which is suitable for use as objectives in a microscope or telescope, and condensing lenses (see U.S. Pat. No. 3,653,933). The glass composition disclosed in U.S. Pat. No. 3,653,933 is a four component glass comprising $PbO-B_2O_3-SiO_2-Al_2O_3$ in which a relatively high level of $SiO_2$ is utilized. While the presence of $SiO_2$ in a large amount provides desirable characteristic in designing an achromatic lens, this high percentage renders the glass unstable, i.e., the glass tends to be milky.

The other system is the so-called "anastigmat" using a compound lens in which the separate components compensate for the astigmatism of each. In other words, since a combination of lenses having substantially the same ratio of refractive index to Abbe number ($n/\nu$) is selected, curved aberration in the image plane can be reduced while spherical aberration is large, thereby obtaining a compound lens corrected for astigmatism. This type of lens system is suitable for adaptor lenses, etc. From the practical standpoint, it is thus desirable that flint glasses and crown glasses used in the same lens system have, at best, the same partial dispersive power. However, flint glass tends to have a considerably higher partial dispersive power to blue light than crown glass. The partial dispersive power to blue light of the crown glass is generally about 0.55, e.g., crown glasses having a partial dispersive power of 0.544 and 0.551 are commercially available.

The ordinary flint glasses available on the market have the partial dispersive power of e.g., 0.605 and 0.608. Up to the present time, there have been found several species of special flint glasses having substantially the same refractive index $n_D$ and dispersive power $\nu_D$ as the ordinary flint glasses and having about 0.01 lower partial dispersive power to blue light. For example, one of the special flint glasses exhibits such excellent properties that the partial dispersive power of blue, $\theta$, is 0.559, this flint glass being of a lead-aluminaborate type, whereas, in an ordinary flint glass of $n_D = 1.61$ $\nu_D = 44$, the partial dispersive power of blue, $\theta$, is about 0.57.

However, the above-mentioned special flint glass has the disadvantage that the weather-proof properties are very bad due to the borate contained therein. In some cases, the flint glass is weathered even during polishing, so it cannot be used unless sandwiched with other lenses. In the case of making a high grade lens having little aberration, in particular, this is an important limitation.

In addition, a flint glass having a high refractive index has been desired to meet various types of optical design requirements.

SUMMARY OF THE INVENTION

The inventors have made efforts to improve the weatherproof properties of the flint glass and found that a glass of the following composition has good characteristics:

$B_2O_3$ : 12.0 — less than 20.0 percent by weight
$Al_2O_3$ : 8.0 — — 16.5 percent by weight
$SiO_2$ : 12.5 — — 19.5 percent by weight
PbO : 42.0 — — 60.0 percent by weight in which the upper limit of $B_2O_3$ is hereafter designated as being in the range of less than 20.0 percent by weight. The refractive index $n_D$ of the flint glass ranges from about 1.68 to about 1.80.

DETAILED DESCRIPTION OF THE INVENTION

The glasses of the present invention may be prepared, for example, by melting a composition containing boric acid ($H_3BO_3$), aluminum hydrate $Al(OH)_3$, minium ($Pb_3O_4$) and flint ($SiO_2$) in proportions such that a glass having the required proportions of these ingredients, as set forth above, may be obtained.

The composition is then melted in a platinum- or platinum alloy-lined vessel at a temperature of 1,100° – 1,450°C. for 5 to 10 hours followed by stirring, cooling, casting and annealing. Either an inert or oxidizing atmosphere may be employed. The presence of a reducing atmosphere should be avoided since such an atmosphere increases the tendency of the product to devitrify.

To illustrate the present invention in greater detail, a flint glass having the following raw material composition was prepared.

Table I

| Composition (grams) | | |
|---|---|---|
| $H_3BO_3$ | Boric Acid | 229.0 |
| $Al(OH)_3$ | Aluminum Hydrate | 135.0 |
| $Pb_3O_4$ | Minium | 608.0 |
| $As_2O_3$ | Arsenious Acid | 2.0 |
| $SiO_2$ | Flint | 169.0 |
| $La_2O_3$ | Lanthanum Oxide | 18.0 |

Each of the above materials employed is ground to a particle size such that it will pass a 100-mesh Tyler standard sieve, except the flint, which possesses a particle size of 150-mesh Tyler.

The above composition was melted under an oxidizing atmosphere (air) in a platinum-lined vessel and maintained in the molten state for 8 hours with stirring, cast, annealed and thereafter cooled at the rate of 1°C./hr. to produce the corresponding glass illustrated in Table III. The temperatures employed (in °C.) during the various steps are set forth in Table II, below.

Table II

| Melting | Casting | Annealing | Cooling |
| --- | --- | --- | --- |
| 1300 | 940 | 440 | 340 |

Similarly, glasses having different compositions were prepared, the ingredients and proportions of which are also shown in Table III.

The partial dispersive power of blue $\theta$, defined by $n_g - n_F/n_F - n_C$ in which $n_g$, $n_F$ and $n_C$ are refractive indexes to a beam of light of wavelength of 435.8 m$\mu$, 486.1 m$\mu$ and 656.3 m$\mu$, respectively.

There is known in the art a lead glass having a low power factor (see U.S. Pat. No. 2,393,448), the composition of which may vary over a wide range.

The composition of the glass of the invention has been described above, and the upper and lower limits set forth for each component are determined as follows:

TABLE III

| Composition of Glass (wt.%) | Example Number | | | |
| --- | --- | --- | --- | --- |
| | 1 | 2 | 3 | 4 |
| $B_2O_3$ | 12.9 | 15.1 | 17.6 | 19.5 |
| $Al_2O_3$ | 8.8 | 9.3 | 10.0 | 10.7 |
| PbO | 59.4 | 56.7 | 53.7 | 49.7 |
| $As_2O_3$ | 0.2 | 0.2 | 0.2 | 0.8 |
| $SiO_2$ | 16.9 | 16.7 | 16.4 | 17.0 |
| $La_2O_3$ | 1.8 | 2.0 | 2.1 | 2.3 |
| $ThO_2$ | — | — | — | — |
| ZnO | — | — | — | — |
| $Bi_2O_3$ | — | — | — | — |
| Characteristics Measured | | | | |
| 1. Specific Gravity | 4.48 | 4.30 | 4.12 | 3.92 |
| 2. Water Resistance W (mg) | 0.10 | — | — | — |
| 3. Acid Resistance - S | | | | |
| Loss in Weight (mg) | 75.4 | — | — | — |
| Loss Percentage (%) | 1.68 | — | — | — |
| 4. Optical Constant | | | | |
| $n_D$ | 1.73765 | 1.71936 | 1.70122 | 1.68093 |
| $n_C$ | 1.73103 | 1.71315 | 1.69547 | 1.67706 |
| $n_F$ | 1.75450 | 1.73497 | 1.71573 | 1.69427 |
| $n_g$ | 1.76826 | 1.74778 | 1.72752 | 1.70412 |
| $n_F - n_C$ | 0.02347 | 0.02182 | 0.02026 | 0.01721 |
| $\nu D$ | 31.4 | 33.0 | 34.6 | 39.6 |
| 5. Partial Dispersive Power of Blue Light $= n_g - n_F/n_F - n_C$ | 0.586 | 0.587 | 0.582 | 0.572 |

In Table III, the compositions and characteristics of the glasses of the Examples are shown. In the measurement of the characteristics, the weather-proof property is judged by the water resistance and acid resistance, whose measurement methods are as follows:

Water Resistance — W

A sample of glass is pulverized, washed with water, then with alcohol and dried to give a powdered glass sample of a size of 0.20 – 0.30 mm. The resulting sample is charged to a 200 ml. Erlenmeyer flask of quartz glass with 100 ml. of distilled water, allowed to stand for 1 hour on a hot water bath and the amount of alkaline components exuded is titrated with 1/100 N hydrochloric acid using Methyl Red as an indicator, followed by conversion into an equivalent $Na_2O$(mg.). The lower this amount, the better the water resisting property.

Acid Resistance — S

A similarly treated glass sample of a size of 0.50 – 0.60 mm. (specific gravity (g)) is charged to a cage of platinum, suspended in 80 ml. of a 0.5 percent aqueous acetic acid solution warmed previously in a 100 ml. beaker of quartz glass, allowed to stand for 1 hour on a hot water bath and the resulting loss in weight is converted into a percentage to the specific gravity (g). The larger this value, the larger the solubility, that is, the lower the acid resistance.

Table IV

| Component | Amount of Component Added | | |
| --- | --- | --- | --- |
| | Lower than the Lower Limit | Within the range of the Invention | Higher than the Upper Limit |
| $SiO_2$ | Weather Resistance Lowers | 12.5–19.5 wt % | Tends to Be Milky |
| $Al_2O_3$ | Tendency To Be Milky | 8.0–16.5 wt % | Devitrification Tendency Increases |
| $B_2O_3$ | $\theta$ Increases | 12.0–less than 20.0 wt % | Weather Resistance Lowers |
| PbO | Tendency To Be Milky | 42.0–60.0 wt % | To Be Milky |

As shown in Table IV, the present invention is characterized by the combination of each of the components in the ranges as shown above. In particular, the amount of $B_2O_3$ seriously influences on the properties of the flint glass, in connection with the amount of PbO. Therefore, if the amount of each of the components is outside those described for the present invention, an optical flint glass having excellent weather resistance cannot be obtained and other serious disadvantages such as the tendency to be milky or devitrification occur. The criticality of the components in the ranges is shown in greater detail in the table below, with reference to comparison examples, wherein the values underlined indicate ranges outside those described for the present invention.

Table V

| Composition of Glass (% wt.) | Run No. | | | | | |
|---|---|---|---|---|---|---|
| | A | B | C | D | E | F |
| $SiO_2$ | 19.5 | 12.5 | 17.7 | 12.5 | 15.9 | 17.0 |
| $Al_2O_3$ | 10.0 | 8.3 | 16.5 | 12.2 | 10.6 | 8.2 |
| PbO | 41.2 | 64.0 | 23.5 | 43.5 | 49.4 | 61.8 |
| $B_2O_3$ | 28.0 | 15.0 | 38.5 | 29.5 | 20.3 | 11.0 |
| $As_2O_3$ | 0.3 | 0.2 | 0.3 | 0.3 | 1.5 | 0.2 |
| $La_2O_3$ | 1.0 | — | 3.5 | 2.0 | 2.3 | 1.8 |
| | Milky | Devitrification at 800°C. | Devitrification at 1000°C. | Devitrification at 920°C. | Devitrification at the surface | Devitrification as a whole |

As is clearly shown in Table IV and Table V above, the ratio of each ingredient in the flint glass in accordance with the present invention is critical. Referring to $B_2O_3$ which is the most important factor determining the properties of the flint glass, the objects of the present invention cannot be achieved with compositions outside the ranges called for in the present invention. That is, when $B_2O_3$ is formulated in a lower amount than the lower limit thereof, not only the partial dispersive power of blue, $\theta$, increases but also devitrification occurs over the whole of the glass (Run F); when $B_2O_3$ is contained in a higher amount than the upper limit, the weather resistance lowers and devitrification is caused. Furthermore, a high level of PbO serves in providing an optical flint glass having a high refractive index $n_D$. Thus, an optical flint glass suitable for optical design can be obtained.

When the water resistance and acid resistance of the ordinary special flint glass were measured, to determine the weather resistance thereof, according to the afore-mentioned method, the water resistance — W (conversion to $Na_2O$) was 1.98 mg., the acid resistance — S showed a 616 mg. loss in weight, and a 19.5 percent loss percentage. In the ordinary optical glass, heavy barium crown glass (SK 16, $n_D = 1.620$, $\nu_D = 60.3$) that had been considered to be inferior in weather resistance, the water resistance — W was 2.58 mg., the acid resistance — S was 249 mg. (loss in weight) and the loss percentage by weight was 6.9 percent.

The weather resistance of prior art glasses was further examined in greater detail, in which the amounts of $B_2O_3$ and PbO were slightly modified so as to avoid falling within the criterion set forth in the present invention. The results are shown in Table VI below in which the underlined values indicate those outside the scope of the present invention.

Table VI

| Composition of Glass (wt.%) | Comparison Example No. | | | |
|---|---|---|---|---|
| | 1 | 2 | 3 | 4 |
| $B_2O_3$ | 32.7 | 32.7 | 29.7 | 42.7 |
| $Al_2O_3$ | 14.0 | 14.0 | 12.7 | 9.0 |
| PbO | 38.0 | 35.0 | 41.0 | 38.1 |
| $As_2O_3$ | 0.3 | 0.3 | 0.3 | 0.3 |
| $SiO_2$ | 15.0 | 15.0 | 13.7 | 10.0 |
| $La_2O_3$ | — | 3.0 | 2.6 | — |
| $ThO_2$ | — | — | — | — |
| ZnO | — | — | — | — |
| $Bi_2O_3$ | — | — | — | — |
| Characteristics Measured | | | | |
| 1. Specific Gravity | 3.24 | 3.25 | 3.49 | — |
| 2. Water Resistance W (mg.) | 0.18 | 0.26 | 0.14 | 0.74 |
| 3. Acid Resistance - S | | | | |
| Loss in Weight (mg.) | 167.3 | 141.2 | 153.0 | 651.4 |
| Loss Percentage (%) | 5.20 | 4.35 | 4.39 | 20.5 |

It will be understood from the measured values in the table above that the ranges set forth for the present invention are critical in order to obtain a high quality flint glass. On the contrary, the prior art glasses are very easily weathered.

As is evident from the results of the foregoing examples and comparison examples, the weather resistance of the glass of the invention is far superior to that of ordinary glasses. The partial dispersive power of blue, $\theta$, of the glass in Example 2 of this invention is larger than those of the other examples, but about 0.01 smaller than that of the ordinary glass having similar optical constants, $n_D$ and $\nu_D$ ($n_D = 1.73608$, $\nu_D = 32.0$), that is $\theta = 0.595$.

In this invention, moreover, various oxides were added to the glass of the composition of Example 1 in order to examine the influences thereof, thereby obtaining the result that one or more of $Ta_2O_5$, $La_2O_3$, $ThO_2$ and $Nb_2O_5$ may be jointly used, but the sum thereof must be less than 10 percent by weight in order to retain the desired characteristics of the glass. The amount of $Bi_2O_3$ must be less than 10 percent by weight, since amounts of greater than 10 percent by weight result in some increase in $\theta$. For example, at 10 percent by weight, $\theta = 0.563$. The amount of BeO and $ZrO_2$ must be less than 2 percent by weight, since amounts of greater than that result in devitrification. $Sb_2O_3$ may be added up to a proportion of 11 percent by weight, although the weather proof property tends to be lowered as the amount of $Sb_2O_3$ increases. The amount of $P_2O_5$ must be less than 1 percent by weight due to its devitrification tendency. ZnO and CdO may be added in a proportion of about 10 percent by weight, but, in adding greater than that, the $\nu_D$ rises to $n_D$. $WO_3$ and $TiO_2$ may be added up to about 4 percent by weight, but addition in excess thereof results sometimes in an increases of $\theta$. Alkaline earth metal oxides, such as BaO and CaO may be added up to about 5 percent by weight and, in particular, where $\nu_D$ to $n_D$ may be higher, more may be added. Furthermore, $As_2O_3$ may be used as a fining agent in a small amount of up to about 5 percent by weight, and alkali metal oxides may be added, if in a proportion of about 5 percent by weight.

As illustrated above, the glass of the invention gives a smaller partial dispersive power of blue and a better weather proof property than ordinary flint glasses.

While the invention has been described in detail and with reference to specific embodiments thereof, it will be apparent to one skilled in the art that various changes and modifications can be made therein without departing from the spirit and scope thereof.

What is claimed is:

1. A weather-proof, flint optical anastigmatic glass consisting essentially of on a percent by weight basis
    from 12.5 to 19.5 percent $SiO_2$,
    from 8.0 to 16.5 percent $Al_2O_3$,
    from 12.0 to less than 20.0 percent $B_2O_3$
    and from 42.0 to 60.0 percent PbO.

2. The glass of claim 1, wherein the glass contains up to 10 percent by weight based on the total weight of glass of an oxide selected from the group consisting of $Ta_2O_5$, $La_2O_3$, $ThO_2$, $Nb_2O_5$ and mixtures thereof.

3. The glass of claim 1, wherein the glass contains up to 11 percent by weight based on the total weight of glass of $Sb_2O_3$.

4. The glass of claim 1, wherein the glass contains less than 1 percent by weight based on the total weight of glass of $P_2O_5$.

5. The glass of claim 1, wherein the glass contains up to about 10 percent by weight based on the total weight of glass of ZnO.

6. The glass of claim 1, wherein the glass contains up to about 4 percent by weight based on the total weight of glass of an oxide selected from the group consisting of $WO_3$, $TiO_2$ and mixtures thereof.

7. The glass of claim 1, wherein the glass contains up to about 5 percent by weight based on the total weight of glass of alkaline earth metal oxides.

8. The glass of claim 1, wherein the glass contains up to about 5 percent by weight based on the total weight of glass of $As_2O_3$.

9. The glass of claim 1, wherein the glass contains up to about 5 percent by weight based on the total weight of glass of alkali metal oxides.

10. The glass of claim 1, wherein the refractive index $n_D$ of said flint optical glass ranges from about 1.68 to about 1.80.

* * * * *